US008320311B2

(12) United States Patent
Cheng et al.

(10) Patent No.: US 8,320,311 B2
(45) Date of Patent: Nov. 27, 2012

(54) METHOD AND SYSTEM FOR ESTABLISHING HIGH-SPEED DOWNLINK SHARED CHANNEL

(75) Inventors: Xiang Cheng, Shenzhen (CN); Yazhu Ke, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 749 days.

(21) Appl. No.: 12/438,356

(22) PCT Filed: Aug. 13, 2007

(86) PCT No.: PCT/CN2007/002430
§ 371 (c)(1),
(2), (4) Date: Sep. 9, 2009

(87) PCT Pub. No.: WO2008/025224
PCT Pub. Date: Mar. 6, 2008

(65) Prior Publication Data
US 2010/0008309 A1 Jan. 14, 2010

(30) Foreign Application Priority Data
Aug. 23, 2006 (CN) .......................... 2006 1 0111700

(51) Int. Cl.
*H04W 4/00* (2009.01)
*H04B 7/216* (2006.01)
(52) U.S. Cl. ....................................... 370/329; 370/342
(58) Field of Classification Search .................. None
See application file for complete search history.

(56) References Cited

U.S. PATENT DOCUMENTS
2005/0180449 A1  8/2005 Ranta-aho et al.

FOREIGN PATENT DOCUMENTS
WO   2005104672 A2   11/2005
WO   2006085800 A1   8/2006

OTHER PUBLICATIONS
International Search Report and Written Opinion in International Application No. PCT/CN2007/002430, dated Nov. 22, 2007.

*Primary Examiner* — John Blanton (57) ABSTRACT

A method and system for establishing high-speed downlink shared channel, wherein the method comprises the following steps: RNC indicates Node B to establish high-speed downlink shared channel between the Node B and terminal; in response to the indication of the RNC, the Node B establishes high-speed downlink shared channel between the Node B and the terminal by using the preset high-speed downlink shared channel physical layer category; the terminal establishes radio resource control connection between the terminal and the RNC and returns information on the actual high-speed downlink shared channel physical layer category of the terminal to the RNC; and the RNC judges whether the actual high-speed downlink shared channel physical layer category of the terminal is identical with the preset high-speed downlink shared channel physical layer category, and if not, the RNC indicates the Node B to reestablish high-speed downlink shared channel between the Node B and the terminal by using the actual high-speed downlink shared channel physical layer category of the terminal.

10 Claims, 9 Drawing Sheets

METHOD AND SYSTEM FOR ESTABLISHING HIGH-SPEED DOWNLINK SHARED CHANNEL

CROSS REFERENCE TO RELATED APPLICATIONS OR PRIORITY CLAIM

This application is a national phase of International Application No. PCT/CN2007/002430, entitled "METHOD AND SYSTEM FOR ESTABLISHING HIGH-SPEED DOWNLINK SHARED CHANNEL", which was filed on Aug. 13, 2007, and which claims priority of Chinese Patent Application No. 200610111700.3, filed Aug. 23, 2006.

DESCRIPTION

1. Technical Field

The present invention relates to communication field, and more specifically relates to a method and system for establishing high-speed downlink shared channel.

2. Background of the Invention

The introduction of high-speed downlink packet access property into wireless communication system has greatly increased the throughput of downlink packet data and become key new features in the development of wireless communication system. A new type of channel (high-speed downlink shared channel) is used in high-speed downlink packet access to transmit downlink packet data.

According to the maximum data rate, minimum transmission time interval and maximum receiving code word of high-speed downlink shared channel that supported by the physical layer of high-speed downlink shared channel, the high-speed downlink packet access property of the terminal can be divided into 12 categories different from each other and are reserved to contain 64 categories, which are described and distinguished by high-speed downlink shared channel physical layer category parameter and belong to one of terminal capabilities. 12 categories of high-speed downlink shared channel physical layer and their corresponding physical layer information are referred to table 1.

Figure 1:
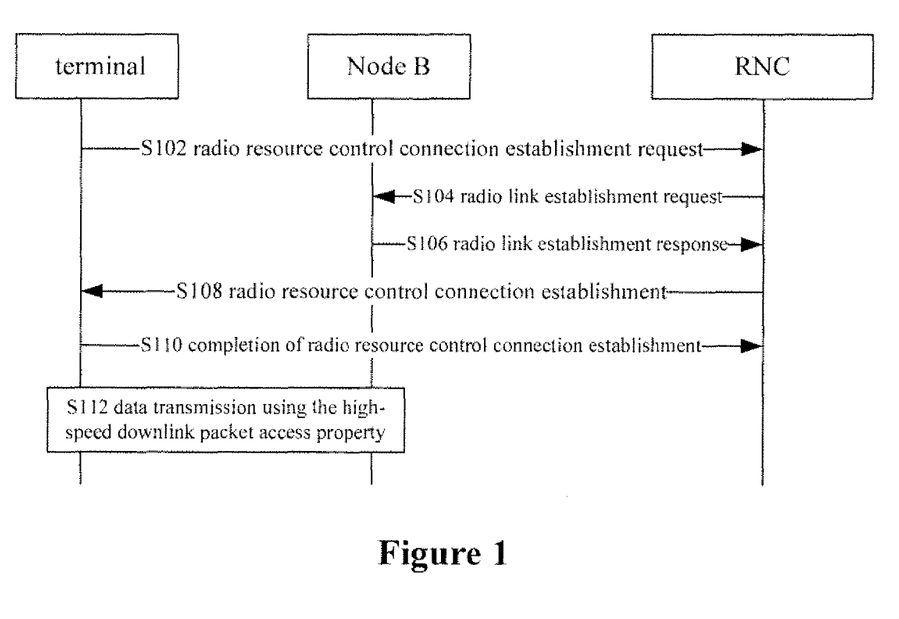
FIG. 1 is a flow chart schematically showing the process of mapping the signaling radio bearer onto high-speed downlink shared channel in the prior art.

It is definitely permitted in the protocol that signaling radio bearer can be mapped onto high-speed downlink shared channel and send data by using the high-speed downlink packet access property. In the existing protocol, the process of mapping signaling radio bearer onto high-speed downlink shared channel, as shown in FIG. 1, comprises the following steps:

S102, the terminal sends radio resource control connection establishment request signaling to radio network controller (RNC). In this signaling, tag information that indicates the high-speed downlink packet access property can be used is the only one information on the high-speed downlink packet access property.

S104, the RNC decides the terminal uses the high-speed downlink packet access property, and maps the radio bearer onto high-speed downlink shared channel. The RNC sends radio link establishment request signaling to Node B and informs the Node B to establish high-speed downlink shared channel. In this signaling, the RNC needs to configure parameters relative to establishing high-speed downlink shared channel including high-speed downlink shared channel physical layer category parameter for the Node B.

S106, the Node B, after successfully establishing high-speed downlink shared channel, return radio link establishment response to the RNC.

S108, the RNC subsequently informs the terminal to establish connection using the high-speed downlink packet access property by radio resource control connection establishment signaling.

S110, the terminal establishes connection using high-speed downlink packet access property according to the indication of the RNC. After the successful establishment, the terminal returns radio resource control connection establishment completion signaling to the RNC. In this signaling, the terminal submits all terminal capability information of itself including high-speed downlink shared channel physical layer category parameter to the RNC. The RNC saves the information for use later.

S112, downlink data is transmitted between the terminal and the Node B in the connection which is successfully established by using the high-speed downlink packet access property.

TABLE 1

| High-speed downlink shared channel physical layer category | Maximum receiving code word of high-speed downlink shared channel | Minimum transmission time interval | Maximum bit number of the transmission block of high-speed downlink shared channel within a transmission time interval of high-speed downlink shared channel | Total bit number of soft channel |
| --- | --- | --- | --- | --- |
| Category 1 | 5 | 3 | 7298 | 19200 |
| Category 2 | 5 | 3 | 7298 | 28800 |
| Category 3 | 5 | 2 | 7298 | 28800 |
| Category 4 | 5 | 2 | 7298 | 38400 |
| Category 5 | 5 | 1 | 7298 | 57600 |
| Category 6 | 5 | 1 | 7298 | 67200 |
| Category 7 | 10 | 1 | 14411 | 115200 |
| Category 8 | 10 | 1 | 14411 | 134400 |
| Category 9 | 15 | 1 | 20251 | 172800 |
| Category 10 | 15 | 1 | 27952 | 172800 |
| Category 11 | 5 | 2 | 3630 | 14400 |
| Category 12 | 5 | 1 | 3630 | 28800 |

The high-speed downlink shared channel physical layer category, being the unique capability property of the terminal, should be informed to Node B in a proper manner to enable Node B to definitely know the capability of the terminal of using high-speed downlink shared channel to ensure the correct establishment and use of high-speed downlink packet access property between Node B and the terminal.

It can be seen from the above process that the step that the RNC obtains high-speed downlink shared channel physical layer category parameter from the terminal is later than the step that the RNC configures the parameter for the Node B. That means the RNC can not configure parameter for the Node B and the Node B can not establish the corresponding high-speed downlink shared channel resource without obtaining the parameter. Although the protocol permits this function, it does not provide any feasible approaches to carry it out.

SUMMARY OF THE INVENTION

In view of the above one or more problems, the present invention discloses a method and system for establishing high-speed downlink shared channel.

The method of establishing high-speed downlink shared channel according to the present invention comprises the following steps:

S602, RNC indicates Node B to establish high-speed downlink shared channel between the Node B and terminal S604, in response to the indication of the RNC, the Node B establishes high-speed downlink shared channel between the Node B and the terminal by using a preset high-speed downlink shared channel physical layer category;

S606, the terminal establishes radio resource control connection between the terminal and the RNC and returns information on the actual high-speed do link shared channel physical layer category of the terminal to the RNC; and S608, the RNC judges whether the actual high-speed downlink shared channel physical layer category of the terminal is identical with the preset high-speed downlink shared channel physical layer category, and if not, the RNC indicates the Node B to reestablish high-speed downlink shared channel between the Node B and the terminal by using the actual high-speed downlink shared channel physical layer category of the terminal.

The step S608 comprises the following steps: S6082a, the RNC judges whether the actual high-speed downlink shared channel physical layer category of the terminal is identical with the preset high-speed downlink shared channel physical layer category; S6084a, if not, the RNC indicates the Node B to reestablish high-speed downlink shared link between the Node B and the terminal; and S6086a, in response to the indication of the RNC, the Node B establishes high-speed downlink shared channel between the Node B and the terminal by using the actual high-speed downlink shared channel physical layer category of the terminal.

Alternatively, the step S608 comprises the following steps: S6082b, the RNC judges whether the actual high-speed downlink shared channel physical layer category of the terminal is identical with the preset physical layer category of high-speed downlink shared channel; S6084b, if not, the RNC indicates the Node B to prepare to reestablish high-speed downlink shared channel between the Node B and the terminal; S6086b, in response to the indication of the RNC, the Node B establishes high-speed downlink shared channel between the Node B and the terminal by using the actual high-speed downlink shared channel physical layer category of the terminal when the time appointed by the RNC comes.

The preset high-speed downlink shared channel physical layer category is defaulted by the Node B or configured to the Node B by the RN-C. The preset high-speed downlink shared channel physical layer category is any one of the 12 physical layer categories of high-speed downlink shared channel.

The system of establishing high-speed downlink shared channel according to the present invention comprises: a first indication device located on RNC side for instructing Node B to establish high-speed downlink shared channel between the Node B and terminal; a first establishment device located on the Node B side for establishing high-speed downlink shared channel between the Node B and the terminal by using the preset high-speed downlink shared channel physical layer category in response to the indication of the first indication device; a second establishment device located on the terminal side for establishing radio resource control connection between the terminal and the RNC and returning information on the actual high-speed downlink shared channel physical layer category of the terminal to the RNC; and a third establishment device located on the Node B side for reestablishing high-speed downlink shared channel between the Node B and the terminal by using the actual high-speed downlink shared channel physical layer category of the terminal in response to the indication of the RNC under the condition that the RNC judges the actual high-speed downlink shared channel physical layer category of the terminal is not identical with the preset physical layer category of high-speed downlink shared channel.

According to the present invention, the system of establishing high-speed downlink shared channel further comprises: a first comparison device located on the RNC side for judging whether the actual high-speed downlink shared channel physical layer category of the terminal is identical with the preset high-speed downlink shared channel physical layer category; a reestablishment indication device located on the RNC side for instructing the Node B to reestablish high-speed downlink shared channel between the Node B and the terminal if the actual high-speed downlink shared channel physical layer category of the terminal is not identical with the preset high-speed downlink shared channel physical layer category.

The system of establishing high-speed downlink shared channel according to the present invention further comprises: a second comparison device located on the RNC side for judging whether the actual high-speed downlink shared channel physical layer category of the terminal is identical with the preset high-speed downlink shared channel physical layer category; a preparation indication device located on the RNC side for instructing the Node B to prepare to reestablish high-speed downlink shared channel between the Node B and the terminal if the actual high-speed downlink shared channel physical layer category of the terminal is not identical with the preset high-speed downlink shared channel physical layer category.

The preset high-speed downlink shared channel physical layer category is defaulted by the Node B or configured to the Node B by the RNC. The preset high-speed downlink shared channel physical layer category is any one of the 12 physical layer categories of high-speed downlink shared channel.

To sum up, the present invention overcomes the defect that: in the process of mapping the signaling radio bearer onto high-speed downlink shared channel in the existing protocol, the step that the RNC obtains high-speed downlink shared channel physical layer category parameter from the terminal is later than the step that the RNC configures the parameter for the Node B so that the RNC can not configure the parameter for the Node B and the Node B can not establish the corresponding high-speed downlink shared channel resource without obtaining the parameter, the present invention provides a feasible approach to carry out the function definitely permitted in the protocol.

BRIEF DESCRIPTION OF THE DRAWINGS

The figures described here provide further understandings to the present invention and are composed to be a part of the present application. The schematic embodiments and their descriptions serve to explain the present invention and are not directed to restrict it. In the figures.

DETAILED DESCRIPTION

The embodiments of the present invention will be described in details as follows.

Figure 2:
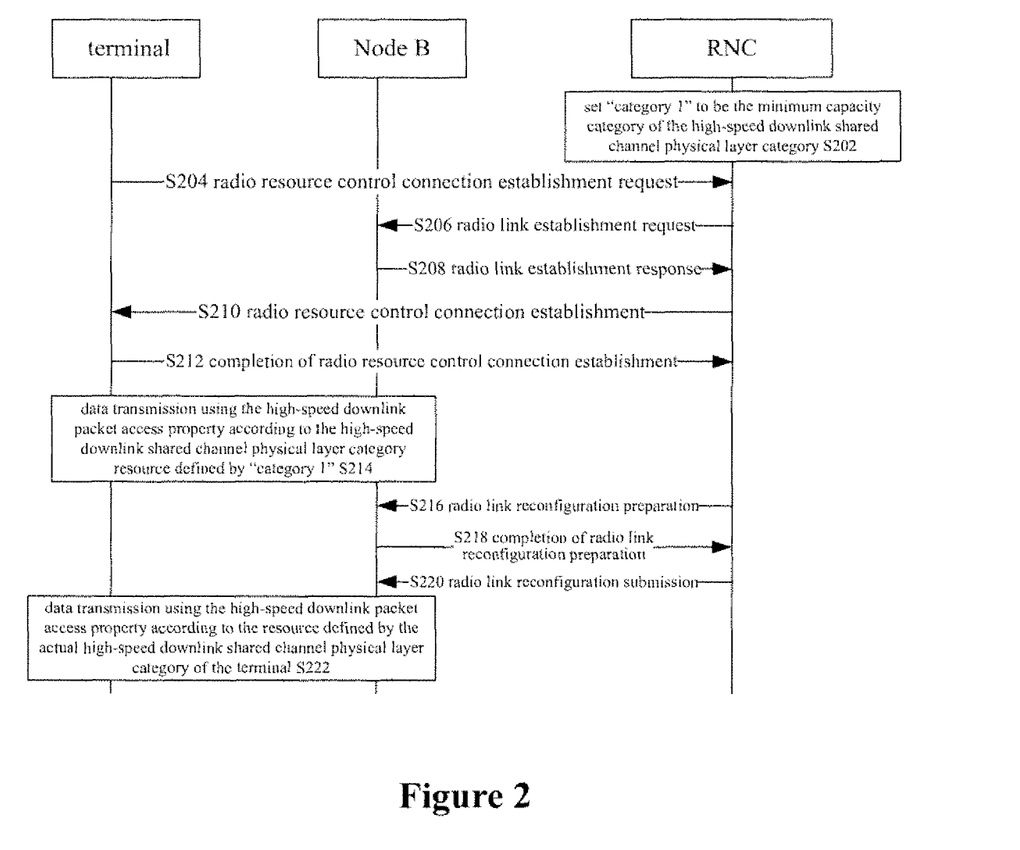
FIG. 2 is a flow chart schematically showing the method of establishing high-speed downlink shared channel according to the first embodiment of the present invention.

The method of establishing high-speed downlink shared channel according to the first embodiment of the present invention will be described in reference with FIG. 2, wherein the second stage of the method shown in FIG. 2 adopts synchronous mode for reconfiguration. As shown in FIG. 2, the method of establishing high-speed downlink shared channel comprises the following steps:

S202 "category 1" is set to be the minimum capacity category of the high-speed downlink shared channel physical layer category.

S204, the terminal sends of radio resource control connection establishment request signaling to the RNC. The radio resource control connection establishment request signaling comprises tag information on whether the high-speed downlink packet access property can be used, but it does not comprise information on the high-speed downlink shared channel physical layer category of the terminal.

S206, the RNC decides the terminal uses the high-speed downlink packet access property, and maps the radio bearer onto high-speed downlink shared channel. The RNC sends radio link establishment signaling to Node B and informs the Node B to establish high-speed downlink shared channel. In this signaling, the RNC configures parameters relative to establishing high-speed downlink shared channel for the Node B. Concerning the high-speed downlink shared channel physical layer category parameter, the RNC uses the preset "category 1", the minimum capacity category for the configuration of the Node B.

S208, the Node B, after successfully establishing high-speed downlink shared channel, returns radio link establishment response signaling to the RNC.

S210, the RNC subsequently informs the terminal to establish connection using the high-speed downlink packet access property over radio resource control connection establishment signaling.

S212, the terminal establishes connection by using the high-speed downlink packet access property according to the indication of the RNC. After the successful establishment, the terminal returns radio resource control connection establishment completion signaling to the RNC. In this signaling, the terminal submits all terminal capability information of itself (including the actual high-speed downlink shared channel physical layer category parameter) to the RNC.

S214, data is transmitted between the terminal and the Node B in the connection which is successfully established by using the high-speed downlink packet access property according to the high-speed downlink shared channel physical layer category resource defined by "category 1".

The RNC judges whether the actual high-speed downlink shared channel physical layer category parameter of the terminal is identical with the high-speed downlink shared channel physical layer category parameter that has been already configured to the Node B. If they are not identical, proceed to the step S216, and if they are identical, the RNC judges it is not necessary to do reconfiguration.

S216, the RNC initiatively originates a reconfiguration process immediately, sends radio link reconfiguration preparation signaling to the Node B and carries the actual high-speed downlink shared channel physical layer category parameter of the terminal in the signaling and reconfigures to the Node B.

S218, the Node B implements the reconfiguration by using the high-speed downlink packet access property according to the indication of the RNC and prepares to define the resource to be used according to the actual high-speed downlink shared channel physical layer category of the terminal. The Node B returns radio link reconfiguration completion signaling to the RNC.

S220, the RNC informs the Node B of the time when the new configuration goes into effect over radio link reconfiguration submission signaling and the reconfiguration process is finished. When the time comes, the Node B makes the new configuration effective.

S222, data is transmitted between the terminal and the Node B in the connection which is successfully established by using the high-speed downlink packet access property according to the resource defined by the actual high-speed downlink shared channel physical layer category of the terminal.

Figure 3:
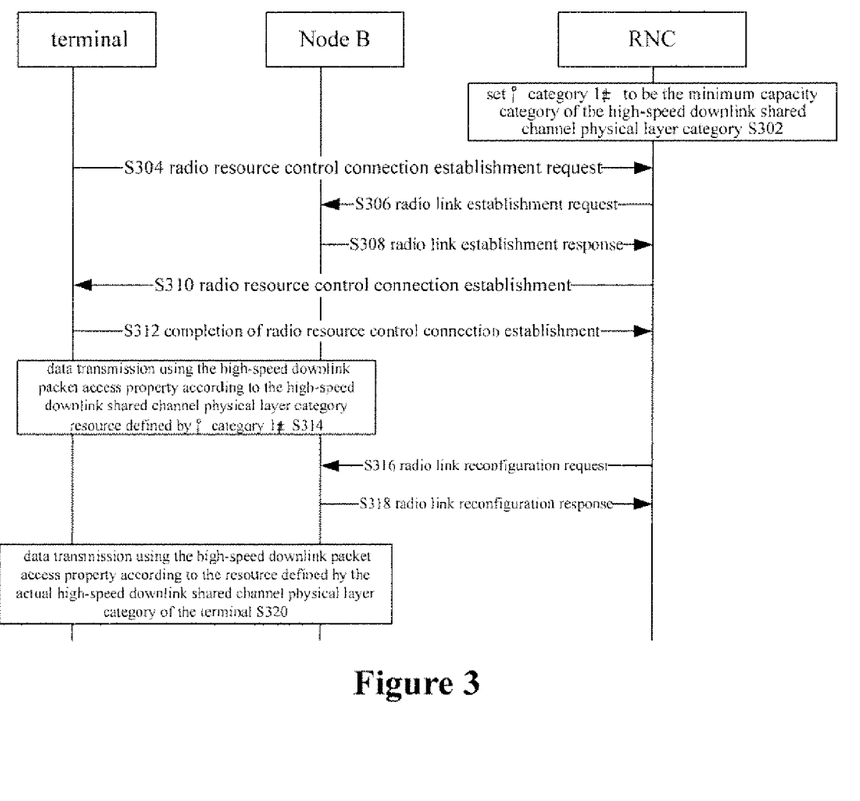
FIG. 3 is a flow chart schematically showing the method of establishing high-speed downlink shared channel according to the second embodiment of the present invention.

The method of establishing high-speed downlink shared channel according to the second embodiment of the present invention will be described in reference with FIG. 3, wherein the second stage of the method shown in FIG. 3 adopts asynchronous mode for reconfiguration. As shown in FIG. 3, the method of establishing high-speed downlink shared channel comprises the following steps:

S302, "category 1" is set to be the minimum capacity category of the high-speed downlink shared channel physical layer category.

S304, the terminal sends of radio resource control connection establishment request signaling to the RNC. The radio resource control connection establishment request signaling comprises tag information on whether the high-speed downlink packet access property can be used, but it does not comprise information on the high-speed downlink shared channel physical layer category of the terminal.

S306, the RNC decides the terminal uses the high-speed downlink packet access property, and maps the radio bearer onto high-speed downlink shared channel. The RNC sends radio link establishment signaling to Node B and informs the Node B to establish high-speed downlink shared channel resource. In this signaling, the RNC configures parameters relative to establishing high-speed downlink shared channel for the Node B. Concerning the high-speed downlink shared channel physical layer category parameter, the RNC uses the preset "category 1", the minimum capacity category for the configuration of the Node B.

S308, the Node B, after successfully establishing high-speed downlink shared channel, returns radio link establishment response signaling to the RNC.

S310, the RNC subsequently informs the terminal to establish connection using the high-speed downlink packet access property over radio resource control connection establishment signaling.

S312, the terminal establishes connection by using the high-speed downlink packet access property according to the indication of the RNC. After the successful establishment, the terminal returns radio resource control connection establishment completion signaling to the RNC. In this signaling, the terminal submits all terminal capability information of itself (including the actual high-speed downlink shared channel physical layer category parameter) to the RNC.

S314, data is transmitted between the terminal and the Node B in the connection which is successfully established by using the high-speed downlink packet access property according to the high-speed downlink shared channel physical layer category defined by "category 1".

The RNC judges whether the actual high-speed downlink shared channel physical layer category parameter of the terminal is identical with the high-speed downlink shared channel physical layer category parameter that has been already configured to the Node B. If they are not identical, proceed to the step S316, and if they are identical, the RNC judges it is not necessary to do reconfiguration.

S316, the RNC initiatively originates a reconfiguration process immediately, sends radio link reconfiguration request signaling to the Node B and carries the actual high-speed downlink shared channel physical layer category parameter of the terminal in the signaling and reconfigures to the Node B.

S318, the Node B implements the reconfiguration by using the high-speed downlink packet access property according to the indication of the RNC and defines the resource to be used according to the actual high-speed downlink shared channel physical layer category of the terminal. The Node B returns radio link reconfiguration response signaling to the RNC, and immediately makes the new configuration effective. The reconfiguration process is finished.

S320, data is transmitted between the terminal and the Node B in the connection which is successfully established by using the high-speed downlink packet access property according to the resource defined by the actual high-speed downlink shared channel physical layer category of the terminal.

Figure 4:
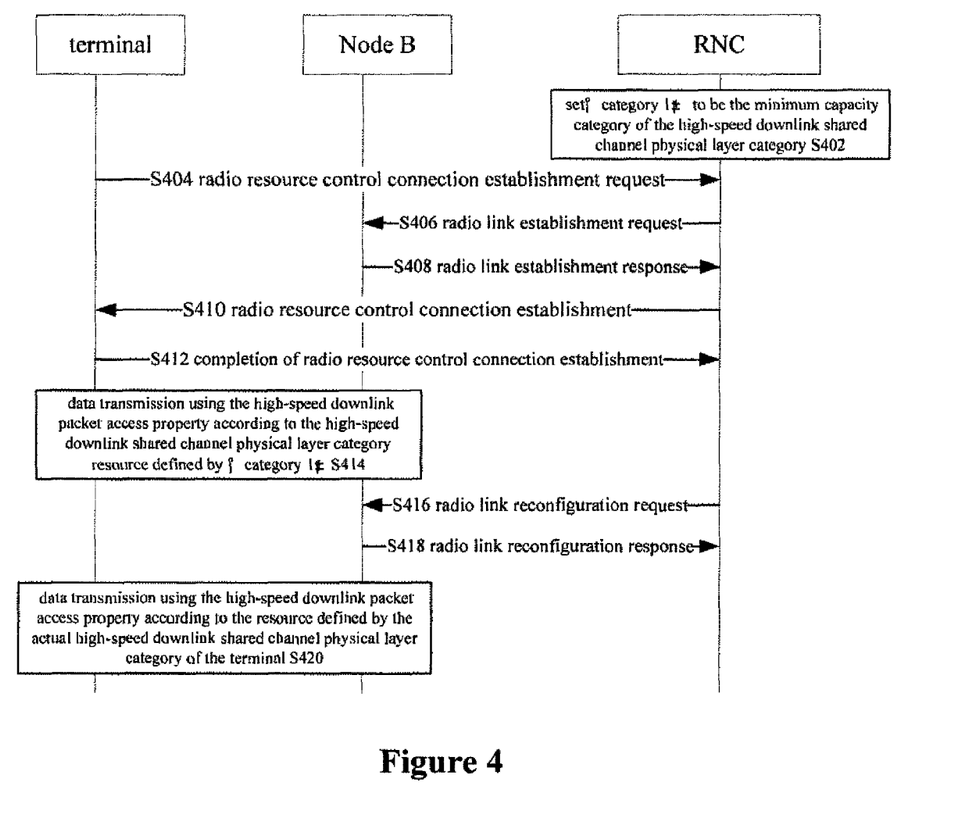
FIG. 4 is a flow chart schematically showing the method of establishing high-speed downlink shared channel according to the third embodiment of the present invention.

The method of establishing high-speed downlink shared channel according to the third embodiment of the present invention will be described in reference with FIG. 4, wherein the second stage of the method shown in FIG. 4 adopts asynchronous mode for reconfiguration. As shown in FIG. 4, the method of establishing high-speed downlink shared channel comprises the following steps:

S402, "category 1" is set to be the minimum capacity category of the high-speed downlink shared channel physical layer category.

S404, the terminal sends of radio resource control connection establishment request signaling to the R-NC. The radio resource control connection establishment request signaling comprises tag information on whether the high-speed downlink packet access property can be used, but it does not comprise information on the high-speed downlink shared channel physical layer category of the terminal.

S406, the RNC decides the terminal uses the high-speed downlink packet access property, and maps the radio bearer onto high-speed downlink shared channel. The RNC sends radio link establishment signaling to Node B and informs the Node B to establish high-speed downlink shared channel resource. In this signaling, no information on the high-speed downlink shared channel physical layer category parameter is carried.

S408, the Node B, after successfully establishing high-speed downlink shared channel, returns radio link establishment response signaling to the RNC. As the Node B finds that the signaling does not carry any information on the high-speed downlink shared channel physical layer category parameter, it uses the defaulted "category 1", the minimum capacity category, to set up resource.

S410, the PNC subsequently informs the terminal to establish connection using the high-speed downlink packet access property over radio resource control connection establishment signaling.

S412, the terminal establishes connection by using the high-speed downlink packet access property according to the indication of the RNC. After the successful establishment, the terminal returns radio resource control connection establishment completion signaling to the RNC. In this signaling, the terminal submits all terminal capability information of itself (including the actual high-speed downlink shared channel physical layer category parameter) to the RNC.

S414, data is transmitted between the terminal and the Node B in the connection which is successfully established by using the high-speed downlink packet access property according to the high-speed downlink shared channel physical layer category defined by "category 1".

The RNC judges whether the actual high-speed downlink shared channel physical layer category parameter of the terminal is identical with the high-speed downlink shared channel physical layer category parameter that has been already configured to the Node B. If they are not identical, proceed to the step S416, and if they are identical, the RNC judges it is not necessary to do reconfiguration.

S416, the RNC initiatively originates a reconfiguration process immediately, sends radio link reconfiguration request signaling to the Node B and carries the actual high-speed downlink shared channel physical layer category parameter of the terminal in the signaling and reconfigures to the Node B.

S418, the Node B implements the reconfiguration by using the high-speed downlink packet access property according to the indication of the RNC and defines the resource to be used according to the actual high-speed downlink shared channel physical layer category of the terminal. The Node B returns radio link reconfiguration response signaling to the RNC, and immediately makes the new configuration effective. The reconfiguration process is finished.

S420, data is transmitted between the terminal and the Node B in the connection which is successfully established by using the high-speed downlink packet access property according to the resource defined by the actual high-speed downlink shared channel physical layer category of the terminal.

Figure 5:
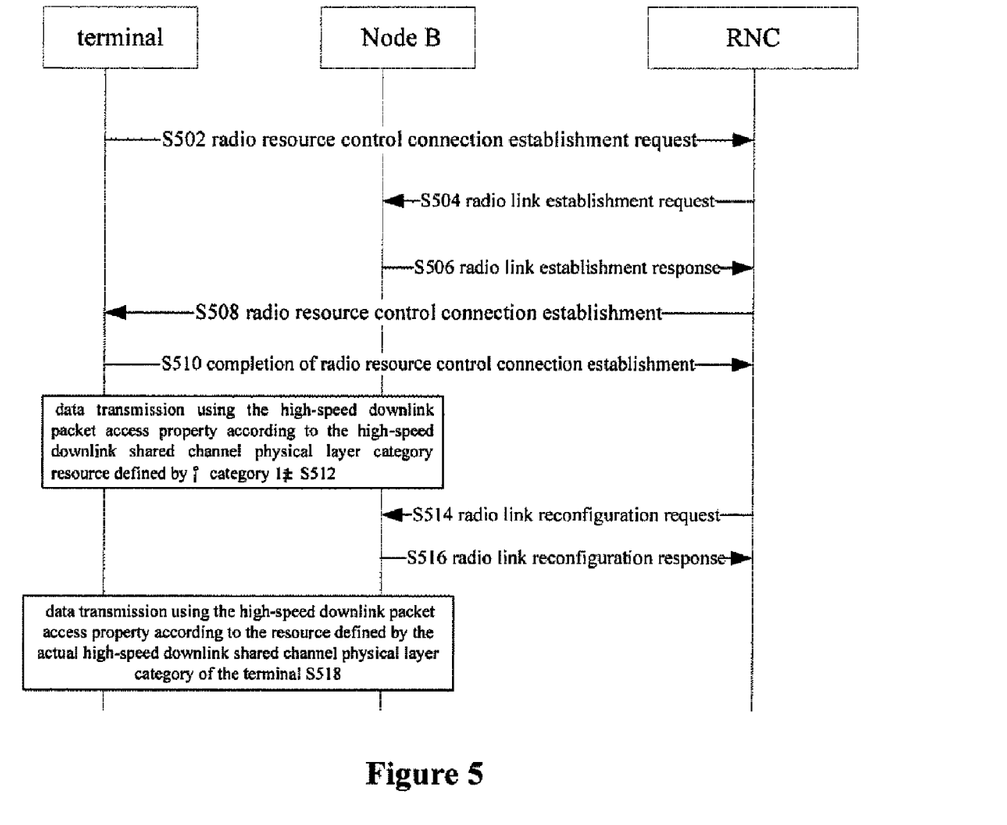
FIG. 5 is a flow chart schematically showing the method of establishing high-speed downlink shared channel according to the fourth embodiment of the present invention.

The method of establishing high-speed downlink shared channel according to the fourth embodiment of the present invention will be described in reference with FIG. 5, wherein the second stage of the method shown in FIG. 5 adopts synchronous mode for reconfiguration. As shown in FIG. 5, the method of establishing high-speed downlink shared channel comprises the following steps:

S502, the terminal sends of radio resource control connection establishment request signaling to the RNC. The radio resource control connection establishment request signaling comprises tag information on whether the high-speed downlink packet access property can be used, but it does not comprise information on the high-speed downlink shared channel physical layer category of the terminal.

S504, the RNC decides the terminal uses the high-speed downlink packet access property, sends radio link establishment signaling to Node B and informs the Node B to establish high-speed downlink shared channel resource. Concerning the high-speed downlink shared channel physical layer category parameter, the RNC discretionarily configures any one of information of the 12 physical layer categories of high-speed downlink shared channel to the Node B.

S506, the Node B, after successfully establishing high-speed downlink shared channel, returns radio link establishment response signaling to the RNC, wherein the Node B uses high-speed downlink shared channel physical layer category configured by the RNC to set up resource.

S508, the RNC subsequently informs the terminal to establish connection using the high-speed downlink packet access property over radio resource control connection establishment signaling.

S510, the terminal establishes connection by using the high-speed downlink packet access property according to the indication of the RNC. After the successful establishment, the terminal returns radio resource control connection establishment completion signaling to the RNC, in which the actual high-speed downlink shared channel physical layer category parameter of the terminal is carried.

S512, data is transmitted between the terminal and the Node B in the connection which is successfully established by using the high-speed downlink packet access property according to the resource defined by the high-speed downlink shared channel physical layer category resource configured by the RNC.

The RNC judges whether the actual high-speed downlink shared channel physical layer category parameter of the terminal is identical with the high-speed downlink shared channel physical layer category parameter that has been already configured to the Node B. If they are not identical, proceed to the step S514, and if they are identical, the RNC judges it is not necessary to do reconfiguration.

S514, the RNC sends to the Node B reconfiguration signaling, in which the actual high-speed downlink shared channel physical layer category parameter of the terminal is carried to implement reconfiguration.

S516, the Node B implements reconfiguration by using the high-speed downlink packet access property according to the reconfiguration signaling of the RNC, and defines the resource to be used according to the actual high-speed downlink shared channel physical layer category of the terminal.

S518, the Node B, after successful reconfiguration, feeds back signaling to the RNC.

Figure 6A:
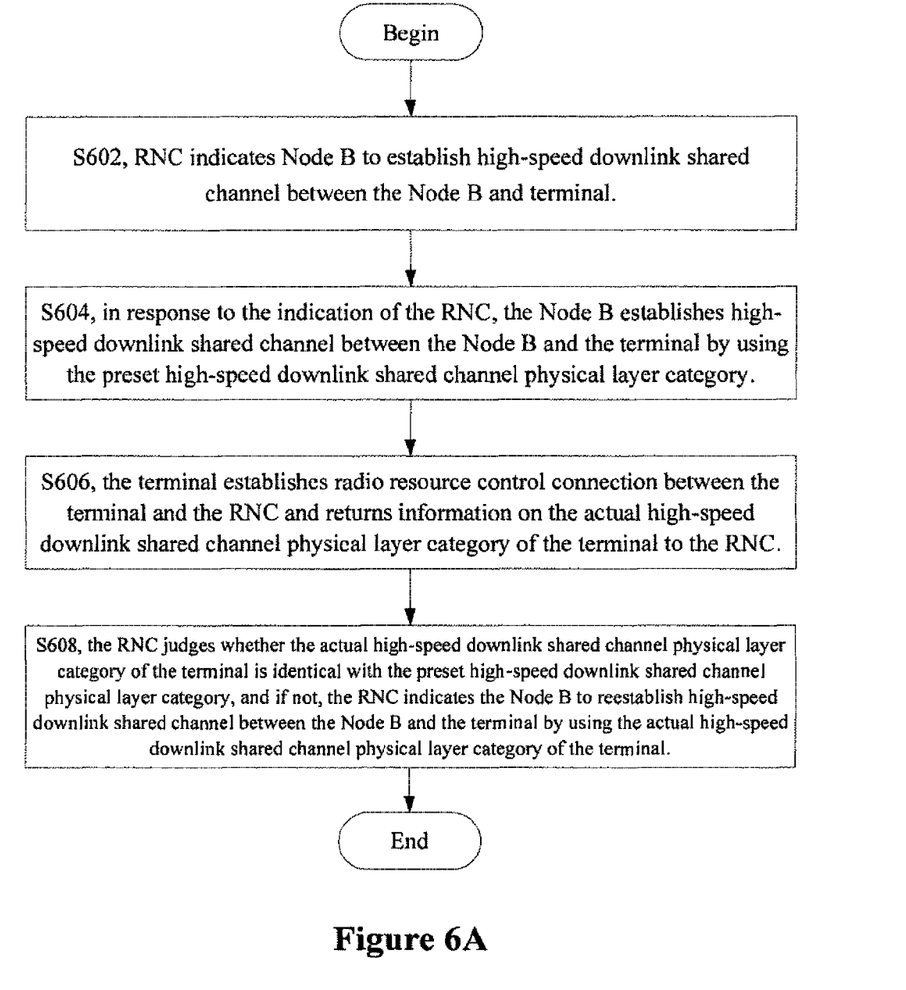
FIGS. 6A to 6C are flow charts illustrating the method of establishing high-speed downlink shared channel according to the present invention.

To sum up, according to the present invention, the method of establishing high-speed downlink shared channel comprises the following steps (as shown in FIG. 6A): S602, the RNC indicates Node B to establish high-speed downlink shared channel between Node B and the terminal; S604, in response to the indication of the RNC, the Node B establishes high-speed downlink shared channel between Node B and the terminal by using the preset high-speed downlink shared channel physical layer category; S606, the terminal establishes radio resource control connection between the terminal and the RNC, and returns information on the actual high-speed downlink shared channel physical layer category of the terminal to the RNC; and S608, the RNC judges whether the actual high-speed downlink shared channel physical layer category of the terminal is identical with the preset high-speed downlink shared channel physical layer category, and if not, the RNC indicates the Node B to reestablish high-speed downlink shared channel between the Node B and the terminal by using the actual high-speed downlink shared channel physical layer category of the terminal.

Figure 6B:
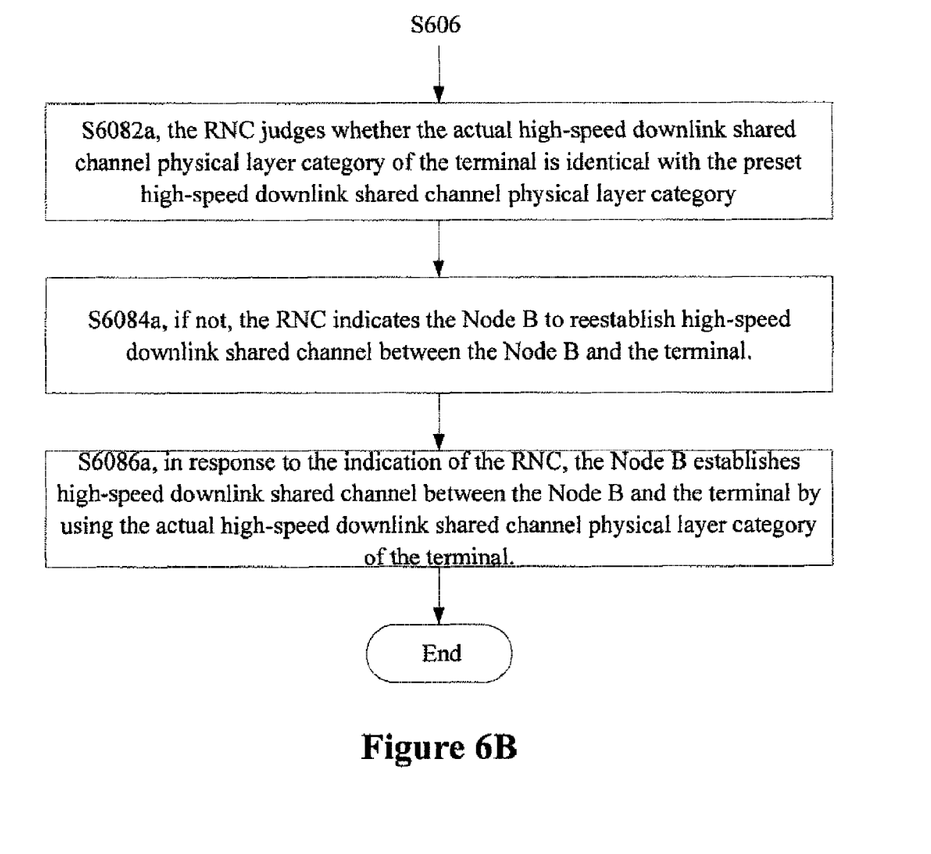

The step S608 comprises the following steps (as shown in FIG. 6B): S6082a, the RNC judges whether the actual high-speed downlink shared channel physical layer category of the terminal is identical with the preset high-speed downlink shared channel physical layer category; S6084a, if not, the RNC indicates the Node B to reestablish high-speed downlink shared channel between the Node B and the terminal; S6086a, in response to the indication of the RNC, the Node B establishes high-speed downlink shared channel between the Node B and the terminal by using the actual high-speed downlink shared channel physical layer category of the terminal.

Figure 6C:
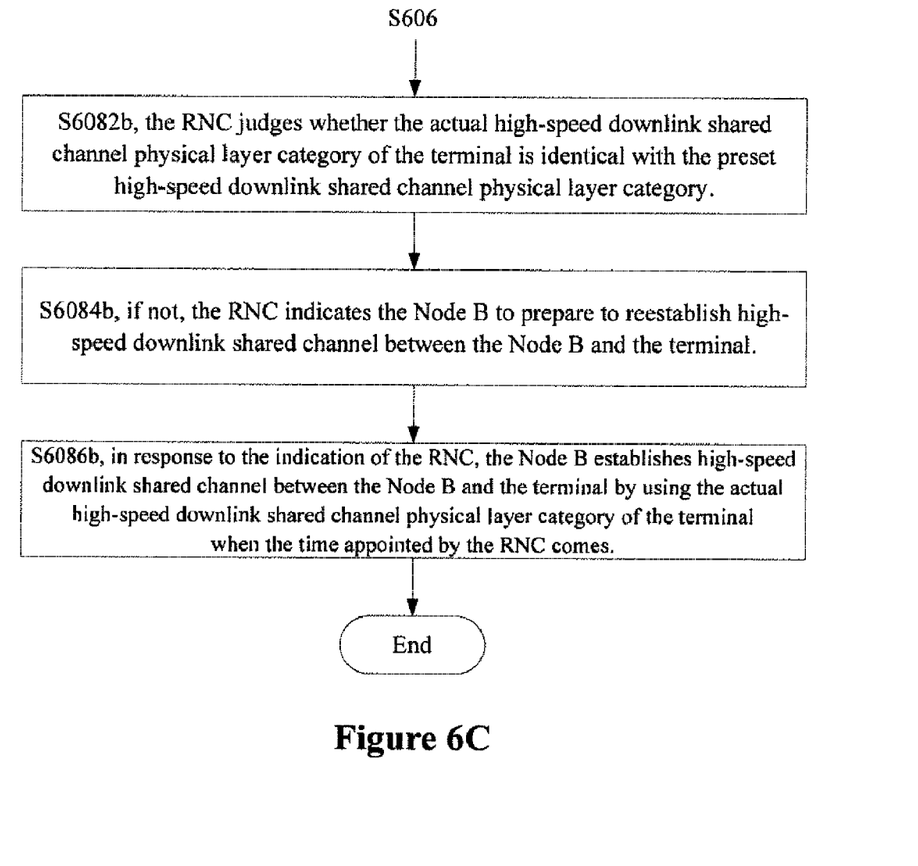

Alternatively, the step S608 comprises the following steps (as shown in FIG. 6C): S6082b, the RNC judges whether the actual high-speed downlink shared channel physical layer category of the terminal is identical with the preset high-speed downlink shared channel physical layer category; S6084b, if not, the RNC indicates the Node B to prepare to reestablish high-speed downlink shared channel between the Node B and the terminal; and S6086b, in response to the indication of the RNC, the Node B establishes high-speed downlink shared channel between the Node B and the terminal by using the actual high-speed downlink shared channel physical layer category of the terminal when the time appointed by the RNC comes.

Wherein the preset high-speed downlink shared channel physical layer category can be defaulted by the Node B or configured to the Node B by the RNC. Moreover, the preset high-speed downlink shared channel physical layer category can be any one of the 12 physical layer categories of high-speed downlink shared channel.

Figure 7:
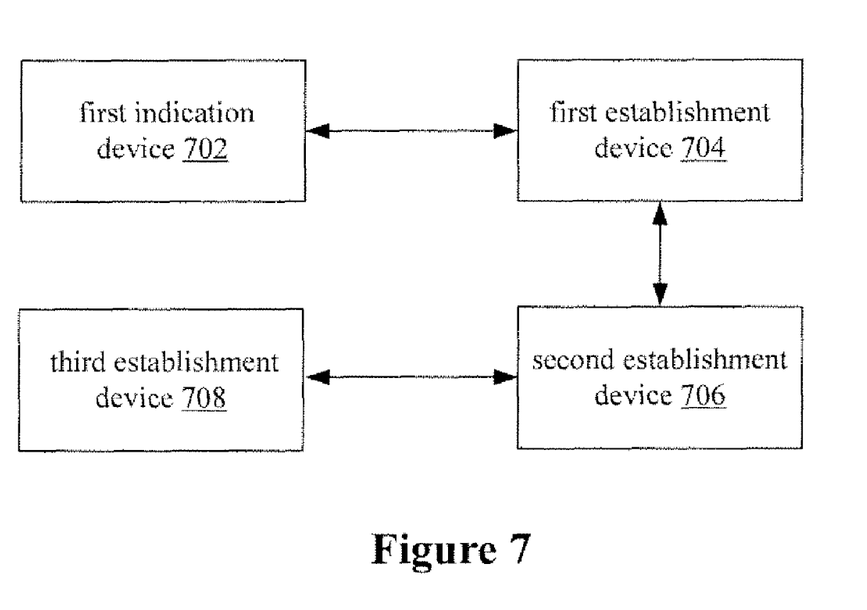
FIG. 7 is a block diagram schematically showing the system of establishing high-speed downlink shared channel according to the embodiments of the present invention.

The system of establishing high-speed downlink shared channel according to the embodiments of the present invention will be described in reference with FIG. 7. As shown in FIG. 7, the system of establishing high-speed downlink shared channel comprises: a first indication device 702 located on RNC side for instructing Node B to establish high-speed downlink shared channel between the Node B and terminal; a first establishment device 704 located on the Node B side for establishing high-speed downlink shared channel between the Node B and the terminal by using the preset high-speed downlink shared channel physical layer category in response to the indication of the first indication device; a second establishment device 706 located on the terminal side for establishing radio resource control connection between the terminal and the RNC, and returning information on the actual high-speed downlink shared channel physical layer category of the terminal to the RNC; and a third establishment device 708 located on the Node B side for reestablishing high-speed downlink shared channel between the Node B and the terminal by using the actual high-speed downlink shared channel physical layer category of the terminal responding to the indication of the RNC under the condition that the RNC judges the actual high-speed downlink shared channel physical layer category of the terminal is not identical with the preset high-speed downlink shared channel physical layer category.

The system of establishing high-speed downlink shared channel according to the embodiment of the present invention, further comprises: a first comparison device located on the RNC side for judging whether the actual high-speed downlink shared channel physical layer category of the terminal is identical with the preset high-speed downlink shared channel physical layer category; a reestablishment indication device located on the RNC side for instructing the Node B to reestablish high-speed downlink shared channel between the Node B and the terminal if the actual high-speed downlink shared channel physical layer category of the terminal is not identical with the preset high-speed downlink shared channel physical layer category.

Alternatively, the system of establishing high-speed downlink shared channel according to the embodiment of the present invention, further comprises: a second comparison device located on the RNC side for judging whether the actual high-speed downlink shared channel physical layer category of the terminal is identical with the preset high-speed downlink shared channel physical layer category; a preparation indication device located on the RNC side for instructing the Node B to prepare to reestablish high-speed downlink shared channel between the Node B and the terminal if the actual high-speed downlink shared channel physical layer category of the terminal is not identical with the preset high-speed downlink shared channel physical layer category.

Wherein the preset high-speed downlink shared channel physical layer category can be defaulted by the Node B or configured to the Node B by the RNC. Moreover, the preset high-speed downlink shared channel physical layer category can be any one of the 12 physical layer categories of high-speed downlink shared channel.

The present invention implements the configuration in two stages to solve the problem that the RNC can not configure the high-speed downlink shared channel physical layer category parameter for the Node B, then the process of mapping the signaling radio bearer onto high-speed downlink shared channel can be successfully achieved.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

What is claimed is:

1. A method of establishing high-speed downlink shared channel, comprising the following steps:
   Step a, RNC indicates Node B to establish high-speed downlink shared channel between the Node B and terminal;
   Step b, in response to the indication of the RNC, the Node B establishes high-speed downlink shared channel between the Node B and the terminal by using a preset high-speed downlink shared channel physical layer category;
   Step c, the terminal establishes radio resource control connection between the terminal and the RNC and returns information on the actual high-speed downlink shared channel physical layer category of the terminal to the RNC; and
   Step d, the RNC judges whether the actual high-speed downlink shared channel physical layer category of the terminal is identical with the preset high-speed downlink shared channel physical layer category, and if not, the RNC indicates the Node B to reestablish high-speed downlink shared channel between the Node B and the terminal by using the actual high-speed downlink shared channel physical layer category of the terminal.

2. The method of establishing high-speed downlink shared channel according to claim 1, wherein the step d comprises the following steps:
   the RNC judges whether the actual high-speed downlink shared channel physical layer category of the terminal is identical with the preset high-speed downlink shared channel physical layer category;
   if not, the RNC indicates the Node B to reestablish high-speed downlink shared link between the Node B and the terminal; and
   in response to the indication of the RNC, the Node B establishes high-speed downlink shared channel between the Node B and the terminal by using the actual high-speed downlink shared channel physical layer category of the terminal.

3. The method of establishing high-speed downlink shared channel according to claim 1, wherein the step d comprises the following steps:
   the RNC judges whether the actual high-speed downlink shared channel physical layer category of the terminal is identical with the preset physical layer category of high-speed downlink shared channel;
   if not, the RNC indicates the Node B to prepare to reestablish high-speed downlink shared channel between the Node B and the terminal;
   in response to the indication of the RNC, the Node B establishes high-speed downlink shared channel between the Node B and the terminal by using the actual high-speed downlink shared channel physical layer category of the terminal when the time appointed by the RNC comes.

4. The method of establishing high-speed downlink shared channel according to claim 1, wherein the preset high-speed downlink shared channel physical layer category is defaulted by the Node B or configured to the Node B by the RNC.

5. The method of establishing high-speed downlink shared channel according to claim 4, wherein the preset high-speed downlink shared channel physical layer category is any one of the 12 physical layer categories of high-speed downlink shared channel.

6. A system of establishing high-speed downlink shared channel, comprising:
   a first indication device located on RNC side for instructing Node B to establish high-speed downlink shared channel between the Node B and terminal;
   a first establishment device located on the Node B side for establishing high-speed downlink shared channel between the Node B and the terminal by using the preset high-speed downlink shared channel physical layer category in response to the indication of the first indication device;
   a second establishment device located on the terminal side for establishing radio resource control connection between the terminal and the RNC and returning information on the actual high-speed downlink shared channel physical layer category of the terminal to the RNC; and
   a third establishment device located on the Node B side for reestablishing high-speed downlink shared channel between the Node B and the terminal by using the actual high-speed downlink shared channel physical layer category of the terminal in response to the indication of the RNC under the condition that the RNC judges the actual high-speed downlink shared channel physical layer category of the terminal is not identical with the preset physical layer category of high-speed downlink shared channel.

7. The system of establishing high-speed downlink shared channel according to claim 6, further comprising:
   a first comparison device located on the RNC side for judging whether the actual high-speed downlink shared channel physical layer category of the terminal is identical with the preset high-speed downlink shared channel physical layer category;

a reestablishment indication device located on the RNC side for instructing the Node B to reestablish high-speed downlink shared channel between the Node B and the terminal if the actual high-speed downlink shared channel physical layer category of the terminal is not identical with the preset high-speed downlink shared channel physical layer category.

8. The system of establishing high-speed downlink shared channel according to claim 6, further comprising:

a second comparison device located on the RNC side for judging whether the actual high-speed downlink shared channel physical layer category of the terminal is identical with the preset high-speed downlink shared channel physical layer category;

a preparation indication device located on the RNC side for instructing the Node B to prepare to reestablish high-speed downlink shared channel between the Node B and the terminal if the actual high-speed downlink shared channel physical layer category of the terminal is not identical with the preset high-speed downlink shared channel physical layer category.

9. The system of establishing high-speed downlink shared channel according to claim 6, wherein the preset high-speed downlink shared channel physical layer category is defaulted by the Node B or configured to the Node B by the RNC.

10. The system of establishing high-speed downlink shared channel according to claim 9, wherein the preset high-speed downlink shared channel physical layer category is any one of the 12 physical layer categories of high-speed downlink shared channel.

* * * * *